INVENTOR.
WILLIAM HAROLD EDMUNDS

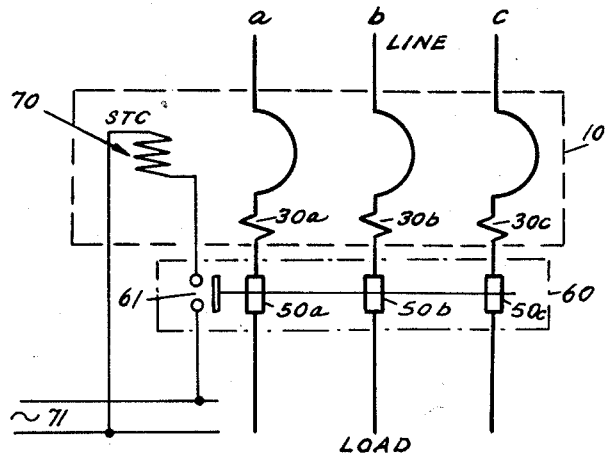
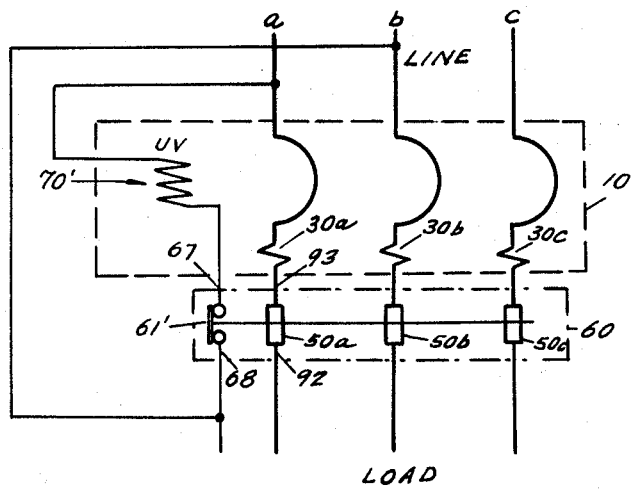

ATTORNEYS

March 15, 1960 W. H. EDMUNDS 2,928,997
COORDINATED CIRCUIT BREAKER AND CURRENT LIMITING DEVICE
Filed May 10, 1955 5 Sheets-Sheet 3
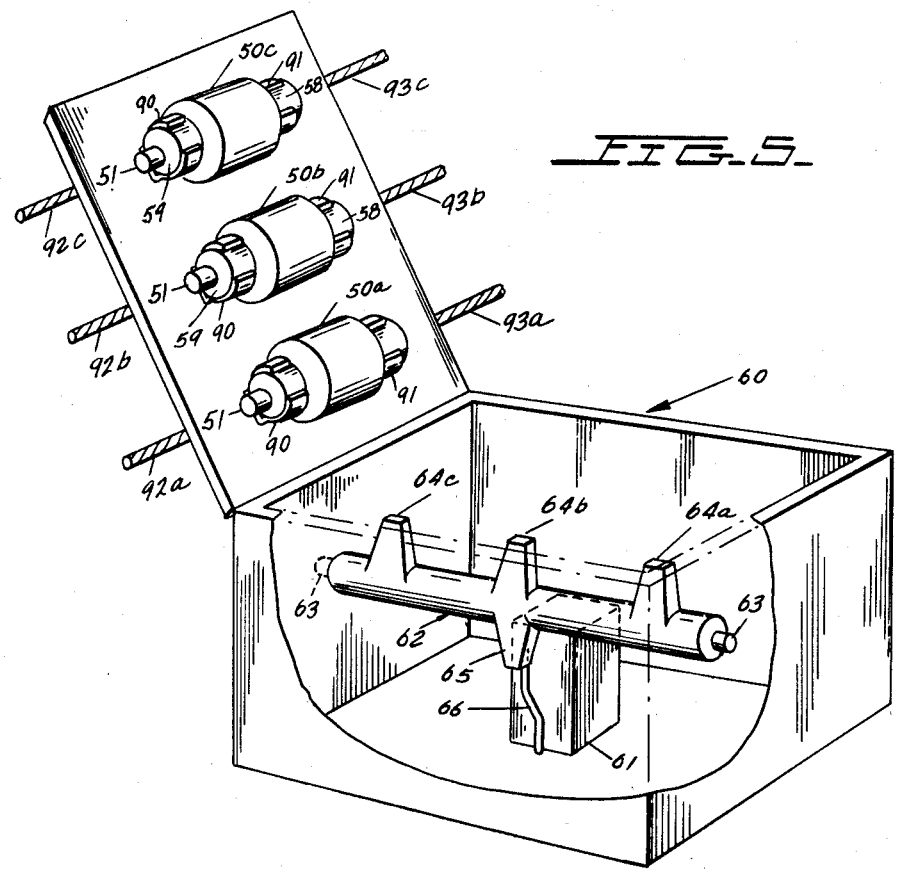
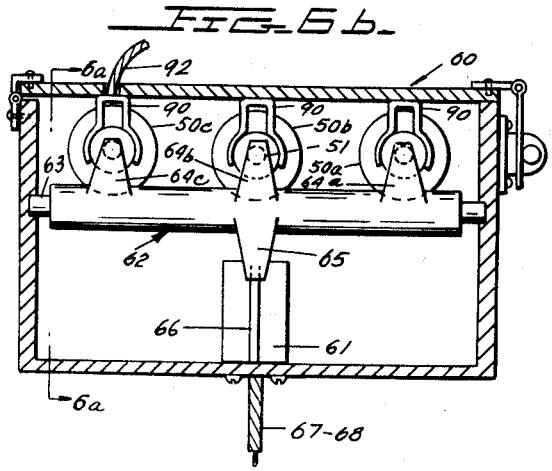
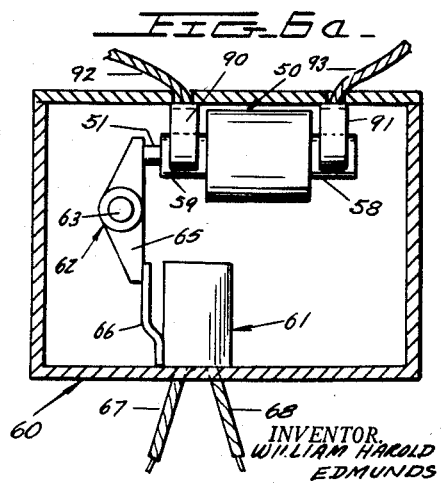
INVENTOR.
WILLIAM HAROLD
EDMUNDS
BY
ATTORNEYS March 15, 1960 W. H. EDMUNDS 2,928,997
COORDINATED CIRCUIT BREAKER AND CURRENT LIMITING DEVICE
Filed May 10, 1955 5 Sheets-Sheet 4
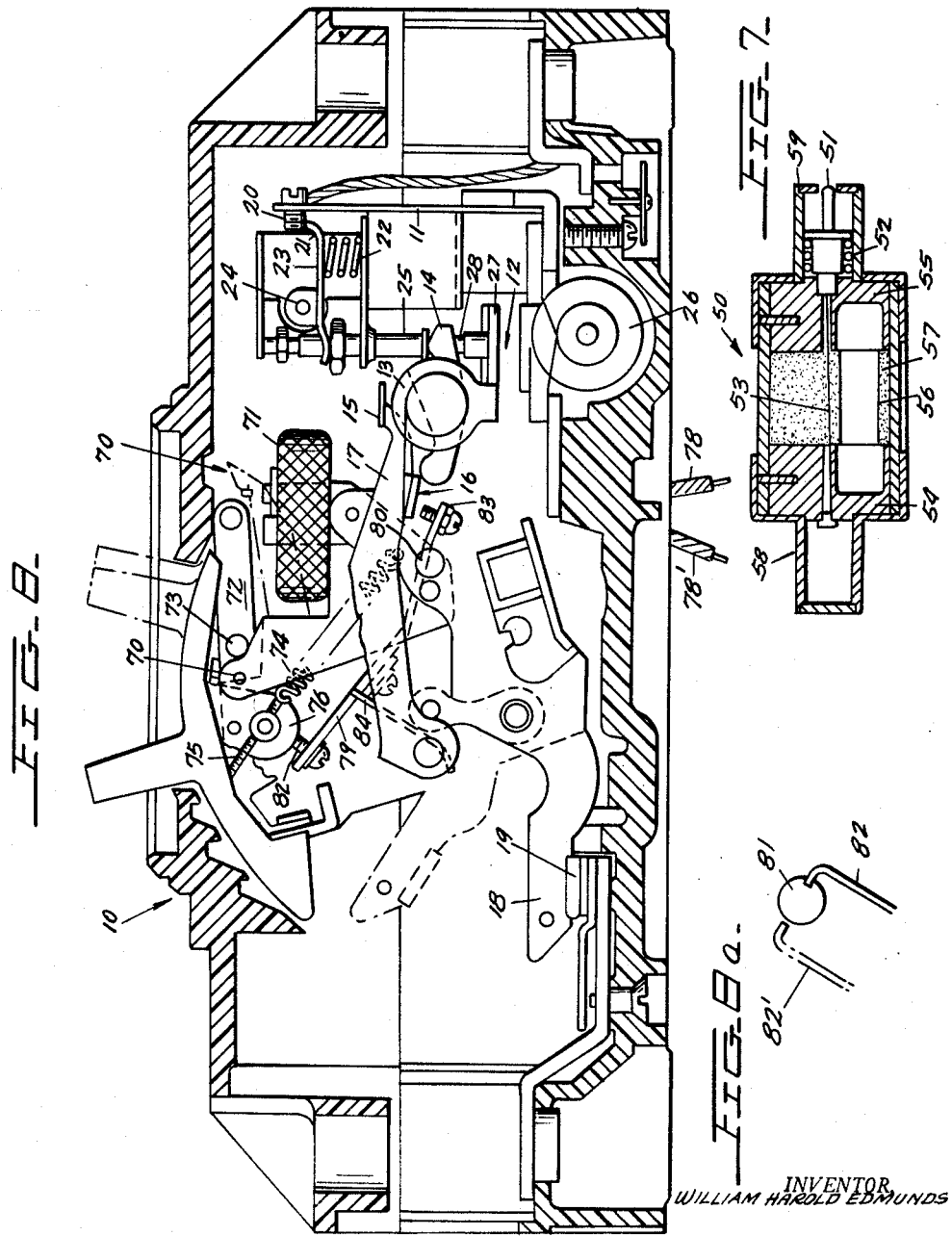
INVENTOR
WILLIAM HAROLD EDMUNDS
BY
ATTORNEYS March 15, 1960  W. H. EDMUNDS  2,928,997
COORDINATED CIRCUIT BREAKER AND CURRENT LIMITING DEVICE
Filed May 10, 1955  5 Sheets-Sheet 5
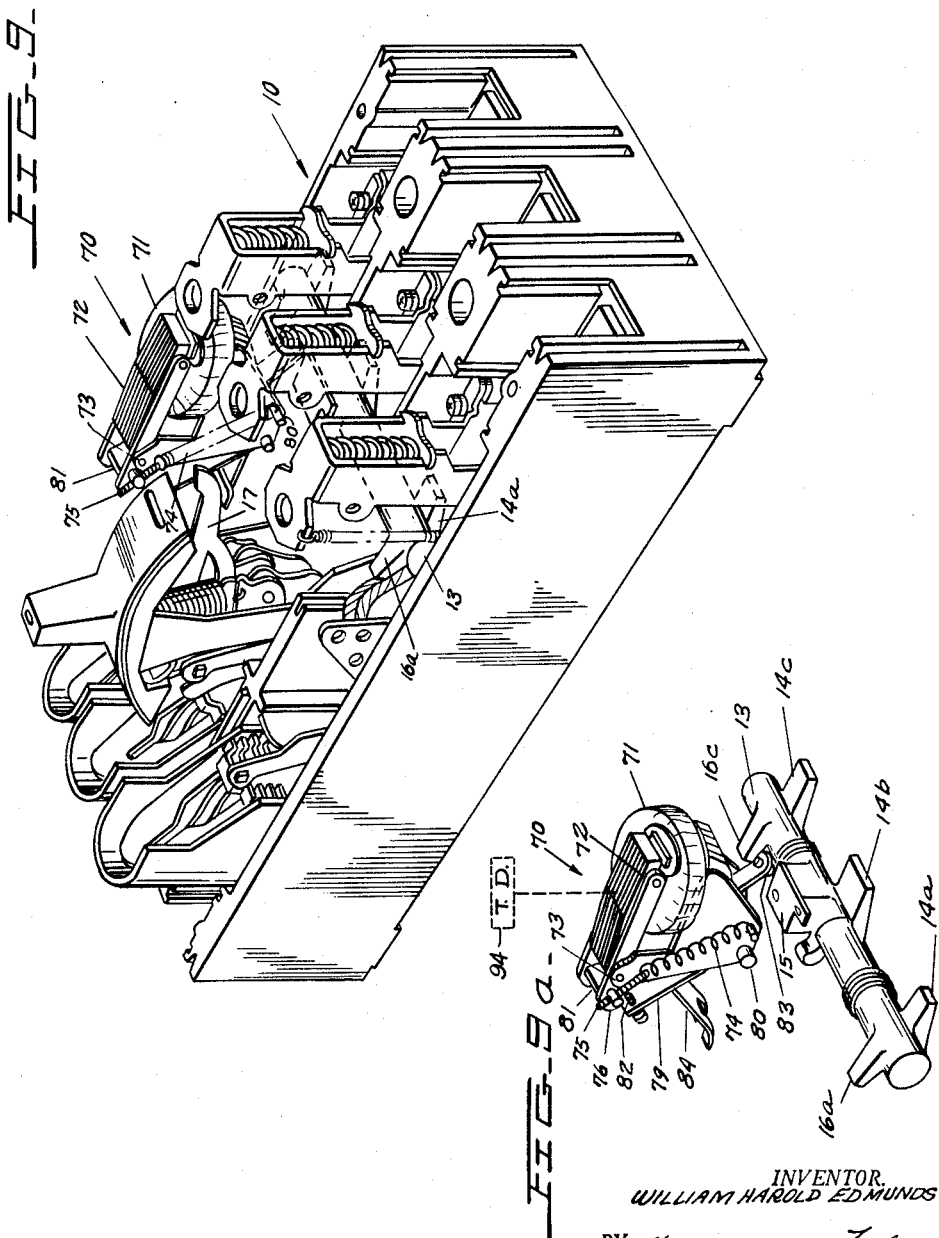
INVENTOR.
WILLIAM HAROLD EDMUNDS
BY
ATTORNEYS

2,928,997

COORDINATED CIRCUIT BREAKER AND CURRENT LIMITING DEVICE

William Harold Edmunds, Havertown, Pa., assignor to I-T-E Circuit Breaker Company, Philadelphia, Pa., a corporation of Pennsylvania Application May 10, 1955, Serial No. 507,443

4 Claims. (Cl. 317—37)

My invention relates to a novel combination for electrical circuit protection comprised of a current limiting device in electrical co-ordination with a circuit interrupter such as a circuit breaker or contactor.

As clearly brought out in my co-pending application Serial No. 461,378, filed October 11, 1954, it is desirable to co-ordinate a current limiting device with a circuit interrupter for the protection of low voltage high current circuits.

The type of current limiting device used in my novel combination is described in U.S. Patent 2,592,399, issued April 8, 1952.

The current limiting device is particularly adaptable on a low voltage high current circuit since it has the characteristic of limiting the magnitude of let-through current so that it is a relatively small percentage of the magnitude of available short-circuit current which the circuit is capable of delivering and at the same time is not disproportionate to the magnitude of rated current. By way of a typical example, the let-through current of the current limiting device may be only 10% of the available short-circuit current and may be less than thirty times the magnitude of the rated current of the circuit. In order to have this type of operation, the current limiting device must commence to operate within the first quarter of a cycle of the fault current so that the fault current never is able to rise to the magnitude of the available short-circuit current.

This type of unit, as noted, is particularly adaptable in low voltage high current circuits of, for example, up to 600 volts. Since the magnitude of available short-circuit current is very high, it is essential to mechanically build both the load and the components within the network to withstand the large magnitude of thermal and magnetic stresses which would result if the full available short-circuit current were permitted to flow through the circuit. However, by inserting a current limiting device in the circuit, the magnitude of let-through current is always less than the magnitude of the available short-circuit current which the circuit is capable of delivering. Hence, in this type of installation, the network and load do not have to be constructed to withstand the large thermal and magnetic forces which the available short-circuit current would deliver but instead need only withstand those stresses which would be set up by the let-through current which would flow for only a very short period of time.

Although the current limiting device has proved to be a very successful and desirable protective element for electrical networks, it nevertheless has many disadvantages unless it is co-ordinated with other devices. For example, a majority of the conditions which require circuit interruption in a typical network are in the range of mere over-currents or short-circuit currents which can readily be interrupted by a circuit breaker and is of such magnitude that it will not overstress the network and load.

If there were not a circuit interrupter in electrical co-ordination with the current limiting device, it would be necessary to provide double duty device that has both time delay and fast current interruption. However, the dual element unit has not been satisfactory since it can not approach the degree of fault anticipation as does a unit designed specifically for its current limiting characteristics. The attempt to accomplish purposes of opposite extremes, such as fast fault clearing and its diametrical opposite, time lag, can only result in a compromise. The prior art dual characteristics current limiting devices fall far short of giving protection against fault current of high magnitude. Furthermore, these devices must be replaced following each over-current protection which, of course, is an extremely undesirable condition.

In order to overcome these difficulties, it has been found necessary and desirable to connect the current limiting devices in series with the circuit interrupter. Thus, in some installations, the over-current conditions would be dealt with by the time delay trip unit of the circuit breaker and the circuit breaker contacts would actually interrupt the over-current condition.

The instantaneous trip of the circuit breaker would have a cross-over point with the time delay trip of the circuit breaker at some point in the range between overcurrents and fault current. Thus, for some low magnitudes of fault current, the instantaneous trip of the circuit breaker would pick up and hence, the circuit breaker would interrupt this range of fault currents without the aid of the current limiting device.

The current limiting device is designed so that it has a cross-over range with the instantaneous trip between fault current and severe short-circuit current. For all magnitudes of currents above this cross-over point, the current limiting device would interrupt the circuit with current limiting characteristics.

Even though the fault may have occurred in one phase due to a phase to ground fault, the tripping by either the time delay trip unit or the instantaneous trip unit associated with that phase would be effective to remove the common latch for all three phases of the circuit breaker to thereby result in an interruption of all phases of the circuit breaker. However, for fault currents above the cross-over point of the current limiting device, single phasing operation may result.

In order to prevent this possibility from ever occurring, it is desirable to provide trip co-ordination between the current limiting device and the circuit breaker so that when the current limiting device ruptures, it will be effective to result in tripping of all three phases of the circuit breaker.

Heretofore, an arrangement has been used wherein the current limiting device is provided with means which, upon the rupture of the current limiting device, will mechanically engage a component of the circuit breaker or a link mechanism associated with the circuit breaker to result in the removal of the trip latch so that all three phases of the circuit breaker will open.

By way of example, my co-pending application Serial No. 461,378, filed October 11, 1954, discloses an arrangement whereby the current limiting device acts directly on the common tripper bar of a circuit breaker so that all phases of the circuit breaker will be opened on the occurrence of a fault current above the cross-over point of the current limiting device. This basic arrangement is also shown in my copending application Serial No. 472,969, filed December 3, 1954, now Patent No. 2,888,-535, wherein the striker pin of the current limiting device initially acts on a first lever which, when rotated, will result in the rotation of the common tripper bar of a circuit breaker to effect three phase disengagement.

Still another means of mechanical co-ordination has heretofore been provided as illustrated in my co-pending application Serial No. 468,343, filed November 12, 1954 now Patent No. 2,824,929, wherein a mechanical multiplying means is provided between the current limiting device and the common tripper bar of the circuit breaker.

In my present invention, I provide a novel combination which can achieve all of the desirable results heretofore noted and heretofore accomplished in my co-pending applications in an arrangement wherein the current limiting device is physically removed from the circuit breaker.

In all of the above mentioned applications, it has been assumed that the current limiting device can be positioned in close proximity to the circuit breaker in order to achieve the desired mechanical co-ordination therebetween. However, in some installations, it is either impossible or undesirable to place the current limiting device either within the confines of the circuit breaker or on an auxiliary housing of the circuit breaker or adjacent to the circuit breaker. It is this type of installation to which my invention is particularly adaptable. Also, in many installations, as, for example, the protection of a motor by a contactor, it is desirable to provide an auxiliary unit which need only be connected electrically to the circuit to provide current limiting characteristics.

In my novel combination, there is a current limiting device provided for each phase of the circuit to be protected and these current limiting devices may be physically removed from the circuit breaker although connected in electrical series therewith. The current limiting devices are provided with means to close an energizing circuit for a shunt trip device of the circuit breaker. Thus, on the occurrence of a fault in any one phase above the cross-over point of the current limiting device, the current limiting device will rupture and in so doing, will result in the energization of the shunt trip device for the circuit breaker thereby insuring that all three phases of the circuit breaker will be opened.

It will be noted that the instant invention is equally applicable for an under-voltage device associated with the circuit breaker. That is, the rupture of any one of the current limiting devices could result in the deenergization of the under-voltage device for the circuit breaker and thus, result in three phase interruption.

My instant invention is also extremely desirable for modification of existing circuit breakers and circuit breaker installations so that they can have the advantages of electrical co-ordination with a current limiting device. That is, a separate and distinct unit incorporating only current limiting devices and a micro switch for either the energization of the shunt trip of the circuit breaker or the de-energization of the under-voltage devices of the circuit breaker can be connected in electrical series with an existing circuit breaker so that the circuit breaker will operate in its normal manner for all magnitudes of current below the cross-over point of the current limiting device, as heretofore noted, and for magnitudes of current above the cross-over point of the current limiting device, the current limiting unit will rupture, interrupt a current, and through either the shunt trip or under-voltage device, result in the tripping of the circuit breaker to thereby prevent single phasing.

My invention thus provides a housing containing a current limiting device for each pole, a common actuating shaft and a micro switch in which each current limiting unit is connected in electrical series with respective pole of a contactor or circuit breaker and rupture of any one unit will operate the shaft to cause the micro switch to either energize the shunt trip unit of the circuit interrupter or de-energize the under-voltage unit.

Accordingly, a primary object of my invention is to provide a novel combination of a circuit interrupter and a current limiting device in which the current limiting device is operatively connected to result in the tripping of the circuit interrupter upon the occurrence of a fault current above the cross-over point of the current limiting device.

Another object of my invention is to provide a novel arrangement wherein a circuit interrupter provided with a shunt trip device can be electrically co-ordinated with current limiting devices so that for all current magnitudes above the cross-over point of the current limiting device, it will rupture thereby closing the energizing circuit for the shunt trip to result in the tripping of all three phases of the circuit interrupter.

Another object of my invention is to provide a combination of current limiting device and a circuit interrupter in which the circuit breaker is provided with under-voltage devices so that the rupture of a current limiting device will result in the de-energization of the under-voltage device to thereby cause all three phases of the circuit interrupter to open.

A still further object of my invention is to provide a novel adaption for a circuit breaker having a shunt trip unit in which the circuit breaker need only have an interrupting rating for current magnitudes below the cross-over point of a current limiting device, and for all magnitudes of current above the cross-over point of the current limiting device, the current limiting device will interrupt the current and thereafter result in the opening of all three phases of the circuit breaker due to the energization of the shunt trip to prevent possible single phase operation.

Still another object of my invention is to provide a unit comprised of current limiting devices, an actuating bar and a switch unit wherein the unit provides complete co-ordination with a circuit interrupter when electrically connected thereto.

These and other objects of the invention will be apparent from the following description when taken in connection with the drawings in which:

Figure 1a is a schematic circuit diagram illustrating the electrical connection between the current limiting devices and the circuit breaker controlled by a shunt trip unit.

Figure 1b is a schematic circuit diagram illustrating the electrical connection between the current limiting devices and the circuit breaker controlled by an under-voltage release coil.

Figure 5 is a perspective view of my novel auxiliary unit comprising current limiting devices, auxiliary trip bar and switching device.

Figure 6a is a side view of my novel auxiliary unit taken in the direction of arrows 6a—6a of Figure 6b illustrating the manner in which a current limiting device is operative on an auxiliary tripper bar to operate a micro switch to either energize a circuit for a shunt trip coil or de-energize a circuit for an under-voltage device.

Figure 6b is a cross-sectional end view of the auxiliary unit of Figure 5 illustrating the manner in which the current limiting device associated with each phase operates on a common auxiliary tripper bar to control a single micro switch.

Figure 7 is a cross-sectional view of a typical current limiting device which may be used in connection with my present invention.

Figure 8 is a cross-sectional view illustrating a typical circuit breaker with a coil operated tripping device, the energization of which is controlled by the current limiting device apparatus illustrated in Figures 5 and 6.

Figure 8a is a side view illustrating the manner in which the latch for the coil operated tripping device is connected when the unit operates as a shunt trip. The dotted line of Figure 8a illustrates the manner in which the latch would be positioned if the coil operated tripping device were to function as an under-voltage device.

Figure 9 is a perspective view of the circuit breaker of Figure 8 illustrating all three phases of the circuit breaker and showing the position of the components when the circuit breaker contacts are in the open position.

Figure 9a is a perspective view of the common tripper bar of the circuit breaker illustrated in Figures 8 and 9 illustrating the various flanges and latches by which the tripper bar is controlled and controls the operations of the circuit breaker.

Figure 2:
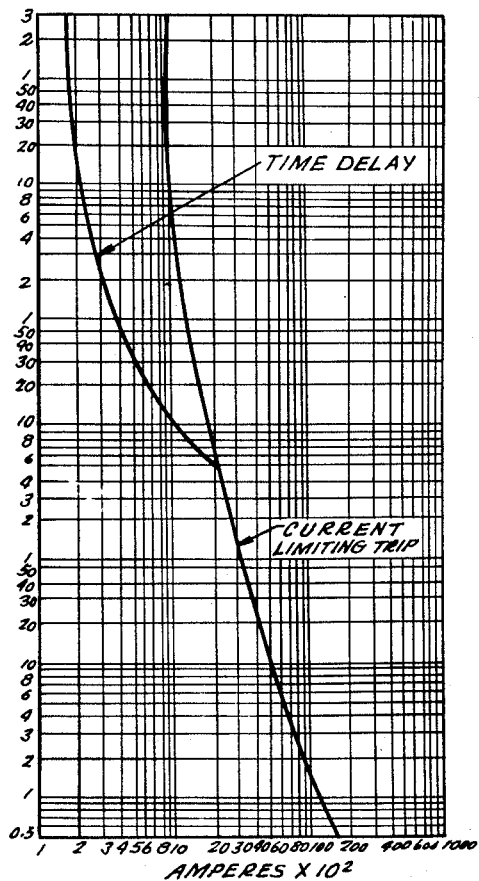
Figure 2 is a time current characteristic curve of a circuit interrupter-current limiting device combination in which the circuit interrupter is provided only with a time delay trip and does not have an instantaneous trip.

Referring to Figure 1a, I have shown a circuit interrupter 10 contained within the dotted line containing three poles for phases A, B and C, each pole of which contains a trip unit 30 and a pair of cooperating contacts with an engaged and disengaged position. In addition, a current limiting device 50 is connected in series with each pole. Thus, when the circuit interrupter contacts are closed, current will flow from the source through cooperating contacts of the circuit interrupter, the trip unit 30, the current limiting device 50 and thence to the load.

The circuit interrupter 10 contained within the dotted line of Figure 1a may be a circuit breaker of the type illustrated in Figures 8 and 9. The details of the current limiting device 50 which may be constructed and function as shown and described in U.S. Patent 2,592,399, issued April 8, 1952, with one construction which may be used for the striker pin of the unit, is illustrated in Figure 7, and the details of the auxiliary unit 60 for the current limiting devices 50 is shown in Figures 5, 6a and 6b.

The construction is such that rupture of any one of the three current limiting devices 50a, 50b and 50c will be effective to close the micro switch 61 contained within the current limiting device apparatus 60, illustrated in Figures 5, 6a and 6b.

The circuit breaker 10 is provided with a shunt trip device 70 which is energized from the auxiliary circuit 71 which contains the micro switch 61.

It will be noted that my novel arrangement can be used with a circuit interrupter having only a time delay trip unit or can be used with a circuit interrupter having both a time delay and an instantaneous trip unit.

It will first be assumed that the circuit breaker contains only a time delay trip 30 co-ordinated with the current limiting device 50 with the cross-over point at 2,000 amperes in which the rated current for the protective device 10—60 is 100 amperes. In this type of installation, overcurrent conditions of the magnitude below 2,000 amperes would be dealt with by the time delay trip unit 30 within the circuit breaker 10. Hence, the trip latch of the circuit breaker 10 would be operated and, by release of the latch through the current tripper bar, the operating mechanism of the circuit breaker would move the operating contacts from the engaged to the disengaged position. Thus, as seen in the characteristic curve of Figure 2, all magnitudes of over-current below 2,000 amperes would be dealt with by the time delay unit of the circuit breaker. Under this condition, the current limiting device would not rupture and hence, the shunt trip coil would remain de-energized during the entire operation.

However, in the event that the current flowing through the circuit exceeds 2,000 amperes, which is the cross-over point for the current limiting device 50, then the current limiting device 50 will rupture thereby completely interrupting the circuit within the confines of the current limiting device itself. However, as heretofore noted in the introduction, it is desirable to insure that all three phases of the circuit breaker open even though the fault is a phase to ground fault. That is, it is desirable and in many installations essential to prevent possible single phasing. Thus, on the occurrence of fault current above 2,000 amperes, one or more of the current limiting devices 50 will rupture.

When the current limiting device 50 ruptures, it is so constructed, as hereinafter more fully explained, so that it will close the micro switch 61 thereby energizing the circuit of the shunt trip device 70 of the circuit interrupter 10. Energization of the shunt trip coil will result in the opening of all three poles of the circuit interrupter 10 so that single phasing will not result.

Figure 4:
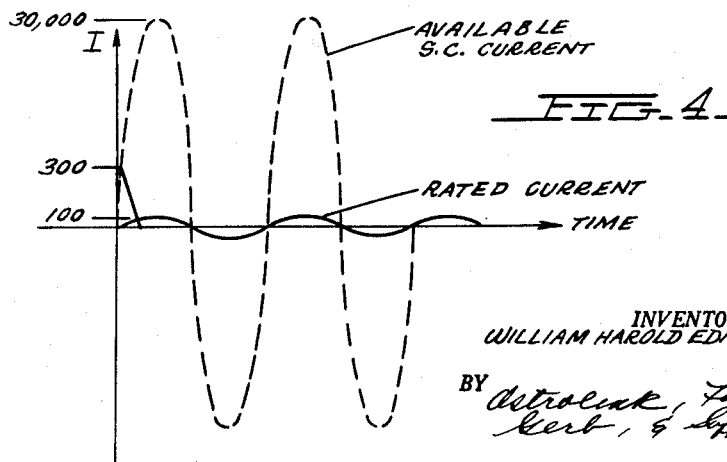
Figure 4 is a current versus time curve plotting rated current, available short-circuit current, and let-through current on a common trip axis.

It will be noted that in the event the circuit is subjected to a short-circuit current which is in the magnitude of the available short-circuit current which the network is capable of delivering, the current limiting characteristics of the current limiting device 50 will not permit the full magnitude of available short-circuit current to flow in the network. Thus, as illustrated in Figure 4, if a short-circuit current in the range of available short-circuit current of 30,000 amperes were to flow through the circuit, the current limiting device 50 would limit the current to 3,000 amperes. That is, the rapid rise of fault current would cause the current limiting device to rupture within a fraction of the first quarter cycle and would prevent the current from rising above 3,000 amperes. This is referred to as the let-through current of the current limiting device 50. At some time after the initial melting of the link within the current limiting device 50, there will be complete interruption within the current limiting device 50 thereby relieving the circuit interrupter 10 of having to interrupt the short-circuit current. That is, the combination of the circuit interrupter 10 and the current limiting apparatus 60 would be capable of properly protecting a network having available short-circuit current of, for example, 30,000 amperes even though the interrupting rating of the circuit interrupter per se is far less than 30,000 amperes. Thus, the entire burden of interruption of fault currents above 2,000 amperes would be taken by the current limiting device. There would, therefore, be complete interruption within the current limiting device 50 and this will result in the closing of the micro switch 61 thereby energizing the trip coil 70 so that all poles of the circuit interrupter 10 could thereafter be opened to provide a disconnect for the circuit. However, the contacts of the circuit interrupter would not have to interrupt the fault current since this task is taken care of by the current limiting device.

Figure 3:
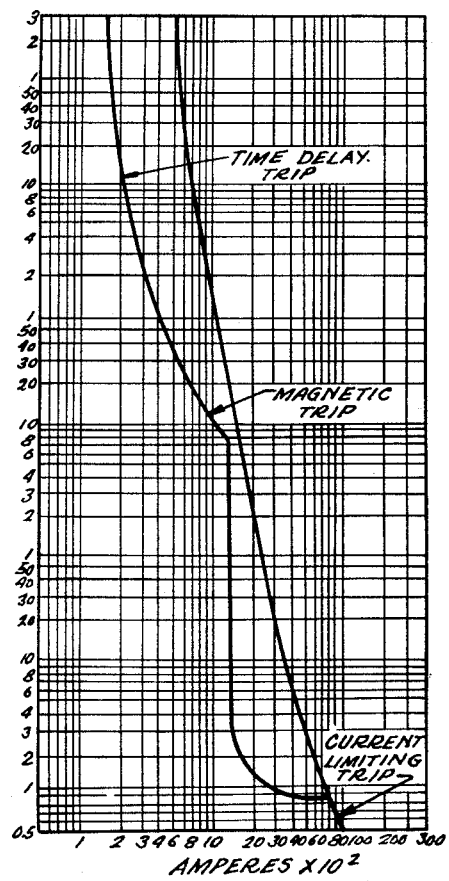
Figure 3 is a time current characteristic curve of a current limiting device-circuit interrupter combination in which the circuit interrupter is provided with both a time delay trip and an instantaneous trip.

The operation of the circuitry described above in connection with Figure 1a assumes that the circuit interrupter 10 is provided with only a time delay trip unit and there is a cross-over point of approximately 2,000 amperes by way of example between the time delay trip 30 and the current limiting device 50. However, in some installations, it may be desirable to retain all of the usual elements within a circuit interrupter for over-currents and fault currents below severe short-circuit current values. In this type of installation, the trip unit 30 would be comprised of both a time delay trip and an instantaneous trip. By way of example, the cross-over point between the time delay trip and the instantaneous trip would be 1,400 amperes as illustrated in Figure 3 and the cross-over point between the instantaneous trip and the current limiting device could be 7,000 amperes. That is, if the protective device comprised of the circuit interrupter 10 and the current limiting apparatus 60 is to be inserted in a circuit wherein the magnitude of available short-circuit current is extremely large, for example, 100,000 amperes, and the circuit interrupter contacts have an interrupting rating of 15,000 amperes, it may be desirable to modify all three trip elements so that for over-currents and fault currents below the circuit interrupter interrupting rating, it would function in its normal manner. That is, on the occurrence of over-currents below 1,400 amperes, the time delay trip of the circuit breaker would operate so that all the poles of the circuit breaker would open and the current limiting device 50 would not be affected. After the fault has been cleared, the circuit interrupter could be reclosed and it would not be necessary to replace any of the current limiting devices.

In the event a fault current occurred on a magnitude between 1,400 and 7,000 amperes, then the instantaneous trip of the circuit interrupter would operate to simultaneously move the contacts associated with each pole of the circuit interrupter from their engaged to their disengaged position.

Also, in this situation, the complete interruption would be achieved by the circuit interrupter and the current limiting devices would not operate. However, if the short-circuit magnitude was 100,000 amperes, then there would be sufficient heat to melt the link between the current limiting device 50 so that it would rupture substantially instantaneously, that is, within the fraction of the first quarter cycle and limit the currents so that it could not rise near the full magnitude of fault current.

Thus, the full interrupting duty would be taken care of by the current limiting device 50. The rupture of the current limiting device 50 would result in the closing of the micro switch 61 which would then energize the trip coil 70 so that all of the poles of the circuit interrupter would trip open on either zero, rated, or mere over-current. However, in no case would the circuit breaker be required to interrupt the full magnitude of fault current which has previously been interrupted by the current limiting device 50.

In the embodiment of Figure 1a, I have shown an electrical co-ordination between the current limiting devices 50 and the circuit breaker 10 in which the circuit breaker is provided with a normal de-energized shunt trip coil so that the rupture of any one of the three current limiting devices 50 would result in the energization of the shunt trip coil so that all poles of the circuit breaker 10 would be simultaneously opened.

In view 1b, I have shown another embodiment wherein the circuit interrupter 10 is tripped by means of an under-voltage release coil 70' instead of a shunt trip coil.

Components of Figure 1b which are identical to components of Figure 1a are identified by the same numerals. Those components which are slightly modified are identified by numerals with primes. Thus, in Figure 1b, I have shown a circuit interrupter 10 having an under-voltage release coil 70' instead of a shunt trip coil 70. In this case, a micro switch 61' would be normally closed rather than normally opened, as illustrated in Figure 1a. The function of the circuit interrupter for all magnitudes of current below the cross-over point of the current limiting device 50a would be identical to the manner of operation heretofore described.

On the occurrence of a fault current condition above the cross-over point of the current limiting device 50, the current limiting device 50 would still interrupt the circuit in the same manner heretofore described. However, when the current limiting device 50 ruptures, it will now be effective to open the micro switch 61' rather than close the micro switch 61 as heretofore described in connection with Figure 1a. Thus, when the micro switch 61' is opened, it will result in the de-energization of the under-voltage switch unit 70' thereby resulting in the opening of all of the poles of the circuit breaker 10.

As heretofore noted, the current limiting device per se forms no part of my instant invention. However, the current limiting device must be provided with some type of mechanical motion in order to close the micro switch 61 whenever the current limiting device ruptures. Although it will be apparent to those skilled in the art that this could be achieved in any manner, as for example by movement of the current limiting device itself or by providing a striker pin with rotational, longitudinal, translatory movement, or any other type of movement of either the striker pin or the body of the current limiting device, I have shown in Figure 7 one preferred embodiment for the construction of the current limiting device.

The current limiting device 50 is provided with a striker pin 51 which is biased to the right by means of the spring 52. A thin wire 53 restrains the spring 52 from driving the striker pin 51 forward. The current limiting device 50 is provided internally with terminal blocks 54 and 55 which secure the inner units 56. The inner units 56 are constructed in substantially the manner shown and described in U.S. Patent 2,592,399, issued April 8, 1952, wherein a reduced cross-sectional fusible ribbon element is surrounded by quartz crystal which melts into the gap created by the ruptured element to result in extremely rapid interruption of the arc and prevention of possible restriking of the arc.

The particular device will operate within less than one quarter of a cycle so that let-through current for some cases will be less than 10% of the available short-circuit current and still not more than thirty times the magnitude of the rated current.

As best seen in Figure 7, the inner unit 56 of the current limiting device contains the main portion of the current limiting unit and is connected in electrical parallel with its restraining wire 53. A quartz filler 57 surrounds both the inner unit 56 and the thin restraining wire 53. Following rupture of the inner unit 56, all of the current will be diverted into the thin restraining wire 53. Due to the small cross-sectional area of the restraining wire 53, it will rupture substantially instantaneously thereby enabling the spring 52 to release its energy to drive the striker pin 51 forward.

The current limiting device 50 is provided with conducting terminals 58 and 59 by which the unit can be connected in electrical series in a circuit. Thus, current flows from the terminal 58 through parallel paths comprised of the restraining wire 53, inner units 56 and the other end terminal 59.

As noted, since the main interruption for the fault current above the cross-over point of the current limiting device 50 will occur within the current limiting device, the interrupting rate requirement of the co-operating contacts of the circuit breaker 10 is substantially reduced since these contacts will then only have to open on either zero current, rated current, or, at most, a mere over-current condition.

In the event that the fault current is below the cross-over point of the current limiting device, then the circuit breaker will only be called upon to interrupt that magnitude of current which is well below the magnitude of severe short-circuit currents.

The current limiting apparatus 60 which may be connected in electrical series and co-ordinated with a standard circuit breaker having either a shunt trip unit 60 or an under-voltage trip unit 61 is illustrated in Figures 5, 6a and 6b. The self-contained unit 60 can also be used to co-ordinate with a contactor in the manner shown in my co-pending application Serial No. 358,157, filed May 28, 1953, now United States Patent No. 2,838,718, issued June 10, 1958 and assigned to the assignee of the instant application, or can be used to modify an existing installation where short-circuit currents are above those for which the installation was designed. This apparatus consists of three current limiting devices 50a, 50b and 50c which may be secured in the unit in any desirable manner as for example by clips 90, 91 to be connected in each phase, respectively, a, b and c of the network in which the circuit breaker 10 is installed. Each clip 90, 91 is electrically connected to wires 92, 93 which enable the self-contained unit 60 to be electrically connected to a circuit protective device.

The apparatus 60 is provided with an auxiliary tripper bar 62 pivoted at point 63 and is provided with three upwardly extending protrusions 64a, 64b and 64c and a downwardly extending protrusion 65. The upwardly extending protrusions 64a, 64b and 64c are positioned in front of the terminals 59, respectively, of the current limiting devices 50a, 50b and 50c so that when the current limiting device 50 ruptures, thereby driving its striker pin 51 forward, it will engage the protrusions 64 associated therewith thereby rocking it, as seen in Figure 6a, in a counterclockwise direction.

It will be noted that biasing means are provided for the auxiliary tripper bar 62 to maintain it in a clockwise direction as illustrated in Figure 6a.

The downwardly extending protrusion 65 of the tripper bar 62 is in the path of the movable contact arm 66 of the auxiliary switch 61. Thus, when the striker pin 51 of the current limiting device 50 rocks the tripper bar 62 about its axis 63, the downwardly extending protrusion 65 will move the movable contact arm 66 of the auxiliary switch 60 to thereby close the circuit to the shunt trip coil in a manner and for the apparatus heretofore described in connection with Figure 1a. This will result in the energization of the shunt trip coil 70 and all the poles of the circuit breaker will be opened.

It will be noted that the auxiliary switch 61 when connected in the circuit of the shunt trip coil is normally open and the wire 67 would then be connected to one terminal of the shunt trip coil and the wire 68 would be connected to one terminal of the source.

In the event it is desired to modify the arrangement to that illustrated and described in connection with Figure 1b wherein the circuit breaker is provided with an undervoltage coil 71', then the wire 67 of the micro switch 61 would be connected to one terminal of the under-voltage coil 70' and the wire 78 would be connected to the line side of the breaker. Thus, the apparatus 60 may be mounted remotely from the circuit breaker with one current limiting device 50 connected in electrical series with each phase of the circuit breaker.

Through the micro switch 61, which is normally open if the circuit breaker has a shunt trip coil 70, and normally closed if the circuit breaker has an under-voltage coil 70', proper control and co-ordination between the current limiting device and the circuit breaker is obtained so that on the occurrence of a fault above the cross-over point of the current limiting device in any one phase, all poles of the circuit breaker will be open to prevent possible single phase operation.

In the illustration of Figure 8 and 9, I have illustrated a typical circuit breaker to which my invention can be applied. It will be apparent to those skilled in the art that the particular construction of the circuit breaker or the particular type of trip means within the circuit breaker or the particular construction of the undervoltage or shunt trip means within the circuit breaker have no bearing on the instant invention.

The illustrations shown in Figures 8 and 9 are only included by way of explanation and not by way of limitation. Thus, for example, in the illustration, I have shown a typical low voltage molded case circuit breaker 10. Figure 8 illustrates a cross-sectional view of the circuit breaker and Figure 9 illustrates a perspective view of all the poles of the circuit breaker. The cross-section of Figure 8 shows the single shunt trip unit which would be incorporated in the circuit breaker to control all poles of the breaker.

For the sake of illustration, it is assumed that the circuit breaker is provided with both a time delay trip and an instantaneous trip without any addition to the current limiting trip. Thus each pole of the circuit breaker will have a bimetal 11 and an instantaneous or magnetic trip 12. The circuit breaker is provided with a common tripper bar 13 which has three extending ledges 14a, 14b, and 14c, respectively, for each phase and a latch 15 and an extension 16. The extending protrusions 14a, 14b and 14c are utilized in connection with the thermal and magnetic trip of the circuit breaker. Latch 15 is utilized to latch the cradle arm 17 in position so as to maintain the cooperating contacts 18 and 19 in engaged position.

On the occurrence of an overcurrent condition, the bimetal 11 will deflect to the right thereby releasing the latch engagement between its adjustment screw 20 and the latch 21 so that the spring 22 can drive the member 23 counter-clockwise around the pivot 24 and thereby bring the sleeve 25 down against the protrusion 14 rocking the common tripper bar 13 in a clockwise direction to release latch 15 and 17. This will result in the rapid opening of the cooperating contacts 18 and 19 in a manner well known in the art. In like manner, on the occurrence of fault current below the cross-over point of the current limiting device 50, the coil 26 will be sufficiently energized to attract its armature 27 of the magnetic trip 12 downwardly thereby pulling the column 28 and its associated sleeve 25 downwardly so as to engage the extension 14 of the common tripper bar 13 and rotate it in a counter-clockwise direction in the same manner as heretofore described to thereby release the latch 15—17 and result in the opening of the co-operating contacts 18 and 19 of each pole of the circuit breaker.

The circuit breaker is provided with a shunt trip device 70 which is comprised of coil 71, armature 72, pivoted at point 73. A biasing spring 74 adjustably connected by means of the screw 75 to an extension 76 of the armature 72 biases armature 72 to the disengaged position. The terminal wires 78 and 78' are connected to the coil 71 and are connected, respectively, to the source and to the terminal wire 67 of the auxiliary switch 61. A latch lever 79 is pivotally mounted at the point 80 by means of a U-shaped extension, not shown for rotation in a counter-clockwise direction.

Lever 79 is provided with an adjustable latch 82 which engages a cut-away section 81 of the armature 72, as illustrated in Figure 8a. Latch 81—82 is in engagement when the armature 72 is in the position illustrated. The lever 79 has adjustment screw 83 which is positioned in the path of the protrusion 16 of the common tripper bar 13.

On the occurrence of a fault current above the cross-over point of the current limiting device 50, the current limiting device 50 will rupture thereby driving its striker pin 51 forward to engage the protrusion 64 of the auxiliary tripper bar 62 to rotate about its pivot 63 to thereby close the auxiliary switch 64. This results in the energization of the shunt trip coil 71 and hence, will attract its armature 72 to rotate it in a clockwise direction about its pivot 73. This will result in the release of the latch 81, 82 and the bias on the lever 79 will thereby drive it in a counter-clockwise direction driving the adjustment screw 83 against the extension 16 of the common tripper bar 13. This will result in the clockwise rotation of the common tripper bar 13 thereby releasing the latch 15—17 to result in simultaneous opening of all of the co-operating contacts 18 and 19 in each pole of the circuit breaker in a manner well known in the art.

It will be noted that the arm 79 is provided with an extension 84 which is positioned in the path of movement of the movable contact arm 18. Thus, when the circuit breaker opens, the arm 18 will engage extension 84 thereby rocking the lever 89 about its pivot 80 to re-latch it with the armature 72 on the latch 81—82 so that the circuit breaker will be prepared to be reset and re-closed. Thus, it will be noted that if a fault current occurs above the cross-over point of the current limiting device 50, this unit will interrupt all of the current and thereafter, due to the electrical co-ordination, energize the shunt trip 70 so that all of the poles of the circuit breaker will simultaneously be opened under either zero current, rated current, or, at most, an over-current condition.

In the embodiment of Figure 8, I have illustrated a shunt trip device 70. However, it will be apparent that this unit can be modified as an under-voltage unit, as illustrated in Figure 1b. That is, by merely reversing the adjustable latch 82 to the position shown in the dotted line of Figure 8a so that there is latch engagement between the member 82—81 when the armature 72 is in the engaged position, the unit will function as an undervoltage device. In this installation, as has heretofore been described, the auxiliary switch 61′ will be normally closed and the rupture of the current limiting device 50 will result in the opening of the auxiliary switch thereby de-energizing the coil 71 and result in the release of the latch 81—82 so that all poles of the circuit breaker will be simultaneously opened.

In some installations, the operation of the current limiting device 50 may be such that although it starts to rupture rapidly, it may not completely interrupt the circuit prior to the start of the opening of the circuit breaker contacts. In this type of installation, it may be desirable to time delay the operation of the tripping device 70 until there is complete circuit interruption in the current limiting device. This may be achieved by connecting a time delay unit 94 (as illustrated in the dotted lines of Figure 9a) to the armature 72 of the tripping device 70. The time delay device 94 may be either of the dash-pot type 80 or escapement type 73, illustrated in Patent 2,704,311, assigned to the assignee of the instant application.

Thus, in summary, I have provided a novel combination of a circuit breaker current limiting device wherein a standard circuit breaker having either a time delay trip and/or a magnetic trip, and which is provided with either a shunt trip device or an under-voltage trip device, can be co-ordinated with a current limiting apparatus which is added in the network so that the circuit breaker will operate in its normal manner for all values of current below the cross-over point of the current limiting device, and for all current magnitudes above the cross-over point of the current limiting device, this device will both interrupt the current and result in the simultaneous opening of all of the poles of the circuit breaker.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A circuit protective device comprised of a first and second trip means, a pair of cooperating contacts, and operating mechanism; a current limiting fuse; said current limiting fuse being connected in series with said pair of cooperating contacts; said operating mechanism operative to move said pair of cooperating contacts from engaged position to disengaged position and vice versa; said first trip means operatively connected to move said cooperating contacts from said engaged position to said disengaged position on the occurrence of a current condition below a first predetermined magnitude; said first tripping means having time delay characteristics; said second trip means operatively connected to move said cooperating contacts from said engaged position to said disengaged position on the occurrence of a current condition above said first predetermined magnitude and below a second predetermined magnitude; said second tripping means being comprised of a unit which has substantially instantaneous operation; a third trip means connected in series with said first and second trip means and operatively connected to move said cooperating contacts from said engaged position to said disengaged position on the occurrence of a current magnitude above said second predetermined current magnitude; said third trip means being operable responsive to operation of said current limiting fuse; time delay means to delay the effect of said third trip means on said pair of cooperating contacts.

2. In a multi-pole circuit protective device comprised of a circuit interrupter and a self-contained current limiting apparatus; said circuit interrupter being comprised of a pair of cooperating contacts and a trip means for each pole and a coil operated tripping device; said coil operated tripping device operatively connected to effect simultaneous disengagement of said contacts upon the occurrence of a predetermined current condition; said self-contained current limiting apparatus being comprised of current limiting devices electrically associated with each pole of said circuit interrupter and a switching device; said switching device electrically connected to said coil operated tripping device of said circuit interrupter; said current limiting devices mechanically interconnected with said switch device to operatively control the energization of said coil operated tripping device; time delay means operatively connected to said coil operated tripping device to delay the control of said coil operated tripping device over said cooperating contacts following actuation of said switch device by said current limiting device.

3. A low voltage high current multi-pole circuit protective device comprised of a circuit interrupter and a self-contained unit; said circuit interrupter being comprised of a pair of cooperating contacts associated with each pole thereof; said pair of cooperating contacts having an engaged and disengaged position; a time delay trip means for each pole of said circuit interrupter and a coil operated tripping device associated with said circuit interrupter; said time delay trip means effective to initiate operation of the operating mechanism on the occurrence of a current having a magnitude below a predetermined value; said self-contained unit being comprised of current limiting devices connected in electrical series with said cooperating contacts; said self-contained unit also containing a switching device which is moved from a first position to a second position by one of said current limiting devices on the occurrence of a current condition above said predetermined current magnitude; said coil operated trip device having a time delay means to delay operation thereof following the operation of said switching device by one of said current limiting devices; said cooperating contacts being simultaneously operated when the condition of said coil operated means is modified by said self-contained unit.

4. A multiple molded case breaker and a self-contained current limiting apparatus; said molded case breaker having all components mounted in a base and a cover to cooperate with said base to thereby enclose said circuit breaker; each pole of said molded case circuit breaker having an arc chute, a pair of cooperating contacts and a trip means; a coil operated trip device and a first tripper bar common to all poles of said molded case breaker; a snap acting toggle operating means for automatic simultaneously operation of said pairs of cooperating contacts; each of said pairs of cooperating contacts having an engaged and disengaged position; said trip means effective through said first tripper bar to initiate operation of said toggle operating mechanism on the occurrence of a current having a magnitude below a first predetermined magnitude; said self-contained current limiting apparatus being carried in a housing independently of said molded case breaker and being comprised of a current limiting device for each pole of said circuit breaker, a second tripper bar and a switching device mounted within said housing; each of said current limiting devices operatively connected through said second tripper bar to control said switching device on the occurrence of a current having a magnitude above said first predetermined magnitude; each of said current limiting devices connected in electrical series with its respective trip means and cooperating contacts in said molded case breaker; said switching device connected in the electrical circuit of said coil operated trip device to thereby control energization thereof; each of said current limiting devices effective to rupture and interrupt on the occurrence of a current having a magnitude above said first predeterminmed magnitude and to result in the simultaneous disengagement of said pairs of circuit breaker cooperating contacts by controlling the energization of said coil operated trip device.

References Cited in the file of this patent

UNITED STATES PATENTS

| | | |
|---|---|---|
| 1,138,170 | Allgood | May 4, 1915 |
| 1,192,974 | Anderson | Aug. 1, 1916 |
| 1,774,417 | Burnham | Aug. 26, 1930 |
| 2,154,703 | Sandin | Apr. 18, 1939 |
| 2,179,342 | Muller | Nov. 7, 1939 |
| 2,330,690 | Dannenberg | Sept. 28, 1943 |
| 2,358,215 | Darling | Sept. 12, 1944 |
| 2,405,929 | Wald | Aug. 13, 1946 |
| 2,416,163 | Dyer et al. | Feb. 18, 1947 |
| 2,473,196 | Dannenberg | June 14, 1949 |
| 2,574,093 | Edmunds | Nov. 6, 1951 |
| 2,666,824 | Dorfman | Jan. 19, 1954 |
| 2,697,148 | Slebodnik | Dec. 14, 1954 |
| 2,823,338 | Edsall | Feb. 11, 1958 |